Jan. 27, 1970  R. L. TOWNSHEND  3,491,972
CLAMP FASTENING ELEMENT
Filed Oct. 13, 1967

INVENTOR
Richard L. Townshend
Townshend & Meserle
ATTORNEYS

United States Patent Office 3,491,972
Patented Jan. 27, 1970

3,491,972
CLAMP FASTENING ELEMENT
Richard L. Townshend, Bethesda, Md., assignor to Tecnico, Inc., Washington, D.C., a corporation of the District of Columbia
Filed Oct. 13, 1967, Ser. No. 675,135
Int. Cl. F16b 15/00
U.S. Cl. 248—71                                     5 Claims

ABSTRACT OF THE DISCLOSURE

A one-piece molded unit of plastic or metal formed as a base strip for application against a wall or other support surface carries an integral attaching portion of the driven fastener type. The driven attaching portion has a frangible junction with the base. Upon application of driving force to the attaching portion it separates from the base and is driven therethrough in the manner of a separate nail to attach the base to a support upon which it is placed.

BACKGROUND

The present invention relates to the art of driven fastening elements and in particular to fasteners used with wall hooks, brackets, decorative plaques, cable holders, and the like.

Prior art devices of this general character, of which U.S. patents Teas 2,317,825, Ekstrom 3,232,572, and Anderson 3,241,797 are representative, usually comprise a base strip or plate with integral pointed spurs extending from the wall or support contact face, or a base strip or plate formed with holes for placement of nails, or screws that are driven or threaded into a wall or other support to anchor the base at a desired location.

In the type represented by Teas Patent 2,317,825, which is basically a form of staple, the base is not initially in face contact with the surface to which it is to be attached, but the spurs are. The base itself constitutes the driving head of the fastener and must be driven to travel a distance equal to the axial length of the spurs, which may bend and become useless.

In the type represented by Ekstrom Patent 3,232,572 and Anderson Patent 3,241,797, the base is held against a wall or other support while the nails are driven home through holes provided in the base. The nails are not initially a part of the base, must be handled separately, and must be hand-guided into position for driving, all of which is awkward and conducive to finger and thumb smashing.

SUMMARY

My invention is a driven fastening element constituted as a one-piece unit of moldable material such as plastic or metal. It includes a base portion having a wall or other support engageable face, and a support penetrating portion integral with the base portion and held in initial driving position by means of a thin, narrow, frangible junction therewith. The junction breaks easily under the impact of a driving force applied to the penetrating portion, whereupon the penetrating portion separates entirely from the base and may be driven home to attach the base to a wall or other support against which it is placed.

DRAWINGS

DESCRIPTION

Figure 1:
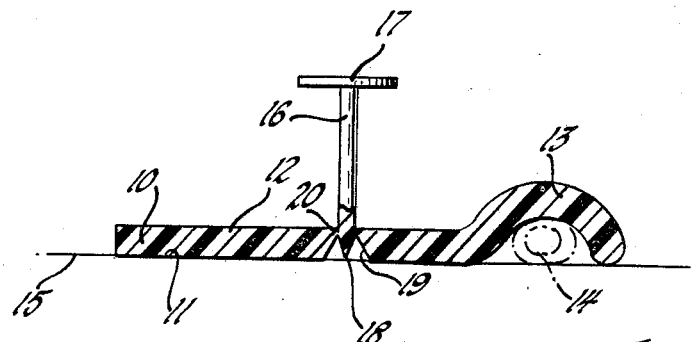
FIG. 1 is substantially a median section through a preferred embodiment of the fastener constituting my invention, prior to use.
Figure 2:
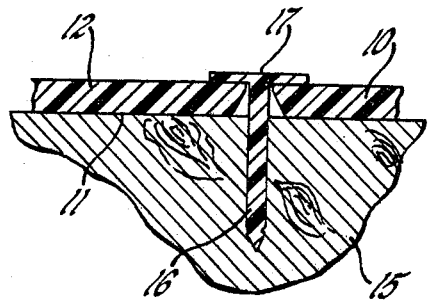
FIG. 2 is a fragmentary section similar to FIG. 1, and showing the relationship of the base portion and the support penetrating portion when the latter is fully driven home.

The fastening element comprising my invention is an integral unit of material such as plastic or metal molded in one piece to provide a base portion 10 having a bottom face 11 and a top face 12. In the preferred embodiment of the invention, as shown in FIGS. 1 and 2, these faces are planar and parallel, and the base 10 is a thin, narrow strip formed at one end with a hook portion 13, here shown as a hold-down clamp for securing a conventional insulated wire conductor 14 to a supporting surface 15 to which the fastener is attached. If desired, the hook portion 13 may be otherwise shaped or may be eliminated.

Substantially midway between its ends the base is formed with an integral shank 16 having a driving head 17 spaced above the top face 12, and a pointed entrant end 18 initially housed within a substantially conical recess 19 open to the bottom face 15 and extending upwardly in the base to a point closely proximate its top face 12. The material of the base between the inner end of the recess and the face 12 provides a very thin and narrow annular junction 20 with the shank 16. This junction is so thin and frangible that it tears easily from the shank when a driving force is applied to the head 17, whereupon the shank may be driven through the recess 19 until its head seats home on the top face of the base, as seen in FIG. 2. The diameter of the head is larger than the diameter of the shank; so that when the head seats against the base it clamps the base against the support to which it is attached. In this form of the fastener the shank 16 is perpendicular to the base and the tip of the entrant point 18 is flush with the bottom face 11 of the base. When the fastener is placed against a wall or other support surface, the entrant point does not penetrate the surface, and the fastener may slide over the support surface without marring it in any way. The recess 19 completely houses the entrant point of the shank.

Figure 3:
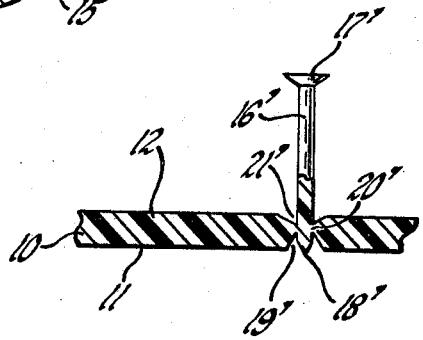
FIG. 3 is a fragmentary section similar to FIG. 1 but illustrating an alternative form of the invention.

In the alternative embodiment of the fastener as shown in FIG. 3, the structure differs from the FIG. 1 form. In the FIG. 3 form the junction 20' between the base 10 and the shank 16' is located approximately midway between the bottom face 11 and the top face 12 of the base, at the inner end of the bottom face recess 19' and the inner end of an identical but opposite recess 21', opening to the top face 12. Recess 21', is countersunk to seat the complemental head 17' of the shank; so that when the shank is fully driven into the support to which the fastener is attached the upper face of the driving head 17' will be flush with the top face 12 of the base. Furthermore, in this FIG. 3 form, the entrant point 18' projects only very slightly outward beneath the plane of the support engageable face 11 of the base and penetrates the adjacent support surface only deep enough to insure that the shank 16' will be properly located for driving.

Figure 4:
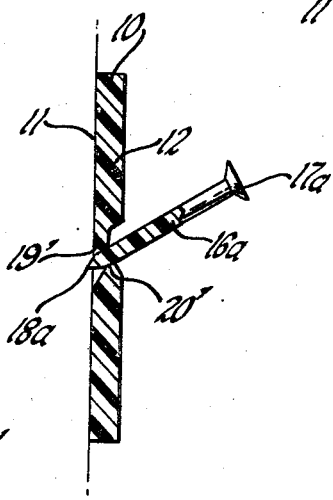
FIG. 4 is a fragmentary section illustrating another alternative form of the invention.

The alternative embodiment illustrated in FIG. 4 is similar to the FIG. 3 structure (like parts having like reference characters) except that the shank 16a is at an angle of approximately forty-five degrees relative to the base 10 instead of perpendicular thereto, and the shank and the head 17a are formed as a conventional wire nail. This form is adapted to "picture hanger" use, where the base is placed against a vertical wall surface. In this form the lower end of the base may be shaped as a picture hanger hook. Also, in this form, the entrant point 18a extends appreciably beyond the plane of the base face 11.

Although the attaching portion comprising the shank 16, head 17, and entrant point 18 is here shown in the form of a nail, it could just as well be a screw, and such is within the purview of my invention.

I claim:
1. A one-piece molded clamp fastening element for use as one part of a two-part clamp in which the other part is a fixed support such as a wall or the like, said element consisting of:
 (a) a base having a support-engageable under face portion and an outer face portion;
 (b) a driven type fastener consisting of a shank integral with the base and projecting therefrom, a tool-engageable head on the outer end of the shank, and an entrant point at its inner end;
 (c) the junction of said shank with the base being frangible and of a thickness substantially less than the cross-section thickness of the base;
 (d) and the body of said base having therein an annular recess housing said entrant point of the shank and opening to the support-engageable face of the base.
2. In the fastening element of claim 1, the tip of the entrant point end of the shank being initially entirely within said recess and substantially flush with the adjacent face of the base.
3. In the fastening element of claim 1, the tip of the entrant point end of the shank projecting slightly outwardly from the adjacent face of the base.
4. In the fastening element of claim 1, said base having therein a second annular recess surrounding the shank and opening to the first named face, the material of the base between the bottoms of the recesses constituting said frangible junction connecting the shank and the base.
5. In the fastening element of claim 1, the cross sectional area of the combined frangible junction and shank being less than the cross sectional area of the shank head.

References Cited

UNITED STATES PATENTS

| | | | |
|---|---|---|---|
| 3,102,571 | 9/1963 | Scott | 151—7 |
| 3,232,572 | 2/1966 | Ekstrom | 248—216 |
| 3,241,797 | 3/1966 | Anderson | 248—71 |
| 3,266,761 | 7/1966 | Walton | 248—71 |
| 3,279,014 | 10/1966 | Fischer | 24—123 X |
| 3,319,510 | 5/1967 | Rapata | 24—73 X |

FOREIGN PATENTS 485,193  7/1952  Canada.

CHANCELLOR E. HARRIS, Primary Examiner

U.S. Cl. X.R.

85—10, 50